Aug. 21, 1951     S. B. CRARY     2,565,297
COMPENSATING ARRANGEMENT FOR TRANSMISSION LINES
Filed Oct. 5, 1949
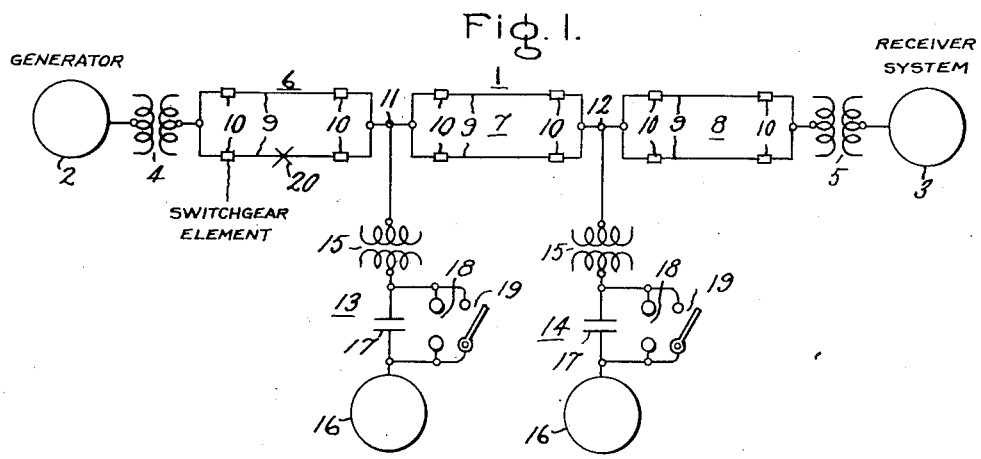
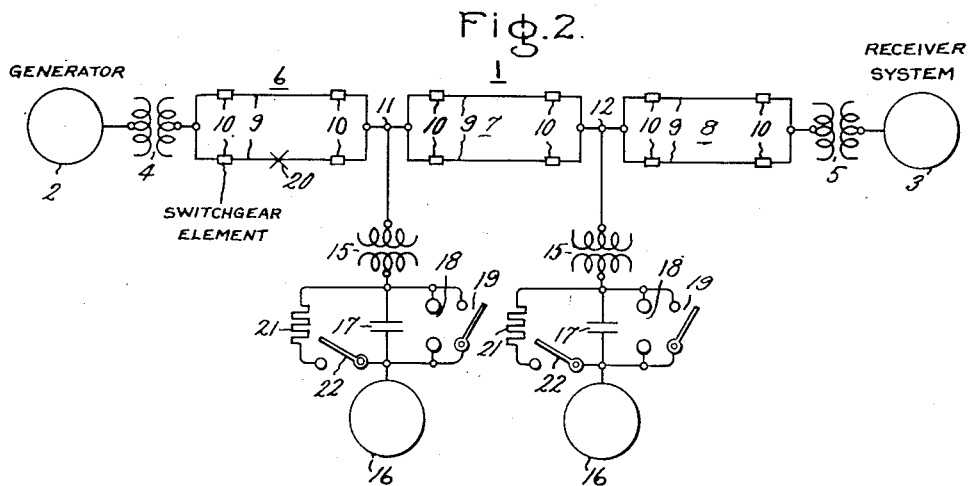
Inventor:
Selden B. Crary,
by Ernest C. Britton
His Attorney.

Patented Aug. 21, 1951

2,565,297

UNITED STATES PATENT OFFICE 2,565,297

COMPENSATING ARRANGEMENT FOR TRANSMISSION LINES

Selden B. Crary, Schenectady, N. Y., assignor to General Electric Company, a corporation of New York Application October 5, 1949, Serial No. 119,693

1 Claim. (Cl. 323—108)

This invention relates to electrical transmission lines and more particularly to the use of intermediate synchronous condensers for compensation thereof.

The use of condensers in relatively long transmission lines to improve the voltage regulation and stability thereof is well known. One arrangement which has been employed is the use of capacitors in series with the transmission line to provide so-called series capacitor compensation. Another arrangement is the use of intermediate synchronous condenser stations at various points along a transmission line. Such stations employ synchronous condensers connected across the transmission line and are generally provided with automatically controlled field excitation in combination with continuously acting static-type voltage regulators. Experience has shown that the use of such regulators with properly co-ordinated excitation systems may substantially increase the power limits of long distance transmission systems. It is with compensating arrangements of the latter type, making use of intermediate synchronous condensers, that the present invention is concerned.

A description of the use of intermediate synchronous condensers and voltage regulators to compensate for a large part of the reactance of the synchronous condenser machines, particularly during steady-state operation, is given in a paper entitled "Long-distance power transmission as influenced by excitation systems," by C. Concordia, S. B. Crary, and F. J. Maginniss, published in Transactions of the American Institute of Electrical Engineers, vol. 65, pp. 974–986. While the limit of steady-state operation in transmission systems as discussed in this paper is of relatively great importance, it has become evident that an even more important limit is the transient limit which must be sufficiently high to allow the system to withstand faults and transient disturbances.

In order to increase the transient limit of a system to the point of rated power transfer, it is generally necessary to compensate the system sufficiently either with series capacitors or intermediate synchronous condensers to provide a relatively high steady-state stability limit. In the case of series compensation the series capacitors must withstand the transient swing current and the transients due to the occurrence and removal of a fault, as well as transients produced by protective apparatus associated with the series capacitors. In such an arrangement, therefore, series capacitors are required to be in a line with high voltage protective equipment and the capacitors must be provided with a relatively high insulation to ground.

For transient conditions of the above-mentioned type the use of intermediate synchronous condensers in a compensating arrangement has many advantages, and is generally desirable from a practical standpoint. The principal problem in the use of intermediate synchronous condensers is that of maintaining the reactance, comprising the synchronous condenser transient reactance plus associated transformer leakage reactance, at a relatively low level during transient as well as steady-state conditions.

Studies of this problem have indicated that the economical power transfer point of a transmission line is near the surge impedance or natural load of the line. Therefore, under normal conditions, intermediate synchronous condensers need contribute relatively little reactive excitation but must be available in case of departing from steady-state conditions. Thus if means may be provided in an intermediate synchronous condenser branch to reduce the effective reactance of the condenser during line disturbances, the rating of the condenser is principally determined by transient conditions.

It is the principal object of this invention to provide a new and improved arrangement making use of intermediate synchronous condensers in combination with certain impedance elements to reduce the effective synchronous condenser reactance in the compensation of transmission lines.

Broadly speaking, the invention provides impedances connected in series with intermediate synchronous condensers in a transmission line to reduce the effective synchronous condenser reactance during transient conditions. According to a preferred embodiment, series capacitors are connected in the intermediate synchronous condenser branch of a transmission line. The series capacitors may be arranged to be switched into the circuit upon occurrence of a line disturbance by the use of conventional protective devices such as relays. According to a modification of the above-mentioned embodiment, resistances are connected in shunt relation with the series capacitors to provide greater compensation without danger of self-excitation than is provided by the use of capacitors alone.

The invention will be better understood by reference to the following description taken in connection with the accompanying drawing and the appended claim, in which the features of the invention believed to be novel are more particularly set forth.

In the drawing Fig. 1 is a one-line schematic diagram of a transmission system provided with intermediate synchronous condenser branches in which capacitors are connected in series with the synchronous condenser machines. Fig. 2 is a modification of the arrangement of Fig. 1 with the addition of resistances connected in shunt relation with the series capacitors.

Referring now to Fig. 1, there is shown an electrical transmission system 1 interconnecting a generator 2 and a receiving system 3, through suitable step-up and step-down transformers 4 and 5 respectively. Transmission system 1 is represented as comprising a plurality of sections 6, 7 and 8, each having a pair of parallel lines 9 and including suitable switchgear elements 10. Sections 6 and 8 are the end sections of transmission system 1 and accordingly are connected to transformers 4 and 5 respectively. Section 7 is the mid-section of system 1 and is connected to sections 6 and 8 at a pair of switching stations 11 and 12 respectively.

Stations 11 and 12 serve as connection points for a pair of intermediate synchronous condenser branches 13 and 14 which are generally similar in construction. Each branch comprises a step-down transformer 15, a synchronous condenser 16, a series capacitor 17, a protective gap 18 and a switching element 19. Synchronous condenser 16 is connected to transformer 15 through series capacitor 17. Transformers 15 of branches 13 and 14 are connected in shunt relation with system 1 at points 11 and 12 respectively.

In each branch protective gap 18, which may be of a conventional type to protect capacitor 17 against voltage surges and the like, is connected in shunt relation with capacitor 17. Switching element 19, which is likewise connected in shunt relation with capacitor 17, may be the contacts of a suitable associated protective device of conventional type such as a relay (not shown), which is arranged to function in response to various types of fault conditions.

It will be understood that the use of synchronous condenser branches such as branches 13 and 14 without the inclusion of series capacitors 17, gaps 18 and switch elements 19, is well known. Such branches are employed to improve system stability and provide required reactive system excitation for power factor correction and voltage regulation. By the addition of series capacitors the transient stability provided by the use of intermediate synchronous condenser branches may be further improved. It is pointed out in the above-mentioned paper that for relatively high line loadings the use of intermediate synchronous condensers is more effective if the total condenser capacity is distributed along the line in branches located at two or three stations as in the arrangement shown in Fig. 1.

In the normal operation of system 1 and branches 13 and 14, switch elements 19 are arranged to be closed thereby short-circuiting or by-passing series capacitors 17 and permitting synchronous condensers 16 to have maximum effectiveness in providing steady-state stability and reactive excitation for system 1. However, in response to certain transient conditions such as a fault 20 in one line of section 9 of system 1 either or both of switch elements 19 may be caused to open by action of the protective devices associated therewith, thereby inserting either or both of capacitors 17 in series with synchronous condensers 16 in branches 13 and 14. The insertion of capacitors 17 effectively reduces the reactances of synchronous condensers 16, thereby providing a relatively high degree of transient stability in system 1. Gaps 18 are effective in protecting capacitors 17 against transient voltage surges which may accompany the occurrence and removal of fault conditions as well as transients which may be produced by the action of protective apparatus.

While the operation of intermediate synchronous condenser branches 13 and 14 as described above provides for inserting capacitors 17 in series with synchronous condensers 16 in case of disturbances in system 1 by the use of switching elements 19, it may be desirable in some cases to have capacitors 17 permanently inserted in series with synchronous condensers 16. In such cases it will be understood that switching elements 19 may be arranged to be maintained open during normal operation of system 1. It is desirable, however, to include switching elements 19 in branches 13 and 14 regardless of whether capacitors 17 are to be switched, since elements 19 may be employed to effect deionization of gaps 18 should breakdown thereof be caused by voltage surges thereacross.

In the arrangement of Fig. 1 I have shown capacitors 17 as connected in series with synchronous condensers 16. Although such capacitors may be located at other points in the system, it is desirable that they be arranged and located in such a manner that they may effectively withstand fault conditions and subsequent swing conditions. An advantage of connecting capacitors in series with an intermediate synchronous condenser branch is that the capacitors may be located on the secondary or low-voltage side of the intermediate synchronous condenser transformers, as exemplified by transformers 15 in Fig. 1. Thus the cost of insulation of the capacitors may be reduced in comparison with the cost of high-voltage series capacitors connected in the main current or power flow path. Furthermore, capacitors connected in shunt branches are in general less apt to be taken out of service by protective apparatus due to faults in a transmission line than would otherwise be the case, since only capacitors at the station near the fault are generally required to be switched. An additional advantage in the case of faults involving ground is that capacitors connected on the secondary side of the synchronous condenser transformers are not required to carry ground components of current.

While in the use of series capacitors connected in intermediate synchronous condenser branches it is generally desirable to obtain maximum compensation, the degree of compensation obtainable is limited by conditions of self-excitation in the transmission system. Such limitations are set forth in U. S. Patent 2,149,082 of R. C. Buell, S. B. Crary, J. W. Butler, and C. Concordia, dated February 28, 1939, and assigned to the same assignee as the present invention. Referring now to Fig. 2 there is shown a modification of the arrangement of Fig. 1 which permits a higher degree of compensation without the danger of self-excitation than is obtainable by the use of capacitors alone as in the arrangement of Fig. 1.

The arrangement of Fig. 2 is substantially identical to the arrangement of Fig. 1 except that the series combination of a resistance element 21 and a switching element 22 similar to switching element 19 is provided in shunt relation with series capacitor 17, gap 18 and switching element 19 in branches 13 and 14. By the use of a shunt resistor of suitable value in combination with the series capacitor in the condenser branch, the tendency for self-excitation to occur may be reduced to a minimum as set forth in the above-mentioned patent. Thus a higher degree of compensation may be secured than would otherwise be the case.

As described in connection with the arrangement of Fig. 1, capacitors 17, in the arrangement of Fig. 2, may be inserted in series with synchronous condensers 16 either permanently or in response to disturbances in system 1, as may be desired, by the use of switch element 19. If it is desired to insert capacitors 17 only in response to fault condtions in system 1, switch 22 may be permanently closed or may be omitted from branches 13 and 14, thus permanently connecting resistor 22 in shunt relation with capacitor 17. Switching element 19 is caused to open in response to the fault conditions, thereby inserting the shunt combination of resistor 21, capacitor 17 and gap 18 in series with synchronous condenser 16 in either or both of branches 13 or 14. By inserting these elements only in response to a line disturbance the full corrective value of the intermediate synchronous condensers may be utilized under normal conditions. Losses occurring in shunting resistors 21 during periods of disturbance are of relatively short duration and therefore do not constitute a serious economic handicap.

Should it be desirable to have capacitors 19 permanently inserted in series with synchronous condensers 16, switching elements 19 may be maintained open as in the operation described in connection with Fig. 1. Under this condition it is generally desirable in order to avoid continuous losses in resistors 21, to maintain switch elements 22 open under normal conditions and to effect closing of elements 22 only in response to disturbances in system 1.

By the use of capacitor elements or combinations of capacitor and resistor elements in connection with intermediate synchronous condensers in accordance with my invention, it will be seen that substantial gains may be realized in the transient stability provided for long-distance power transmission systems, with accompanying increases in the power transmitting capacities thereof.

While I have shown and described a preferred embodiment of my invention together with certain modifications thereof, it will be understood that my invention may well take other forms and I, therefore, aim in the appended claim to cover all such changes and modifications as fall within the true spirit and scope of the invention.

What I claim as new and desire to secure by Letters Patent of the United States is:

In an electric power system, a synchronous condenser for exciting a power transmission line, a capacitor connected between the line and the condenser, a resistor connected in shunt with the capacitor, and switching means connected to short circuit both the capacitor and the resistor to provide maximum reactive excitation for the line and operable to insert the capacitor with the resistor in shunt therewith in series relation with the synchronous condenser to increase the transient stability limit of the line.

SELDEN B. CRARY.

REFERENCES CITED

The following references are of record in the file of this patent:

UNITED STATES PATENTS

| Number | Name | Date |
| --- | --- | --- |
| 1,738,726 | Philip | Dec. 10, 1929 |
| 1,914,428 | Hildebrand | June 20, 1933 |
| 1,973,538 | Moffett | Sept. 11, 1934 |
| 2,162,488 | Marbury | June 13, 1939 |
| 2,363,898 | Partington | Nov. 28, 1944 |